US012732730B2

(12) United States Patent
Zaets

(10) Patent No.: US 12,732,730 B2
(45) Date of Patent: Sep. 8, 2026

(54) IN-EAR MONITOR OPTIMIZED FOR EAR CANAL VOLUME

(71) Applicant: Audio Zenith Inc., San Diego, CA (US)

(72) Inventor: Alexander A. Zaets, San Diego, CA (US)

(73) Assignee: Audio Zenith Inc., San Diego, CA (US)

(*) Notice: Subject to any disclaimer, the term of this patent is extended or adjusted under 35 U.S.C. 154(b) by 156 days.

(21) Appl. No.: 18/741,509

(22) Filed: Jun. 12, 2024

(65) Prior Publication Data

US 2025/0386127 A1 Dec. 18, 2025

(51) Int. Cl.
*H04R 1/10* (2026.01)

(52) U.S. Cl.
CPC ........ *H04R 1/1016* (2013.01); *H04R 2460/11* (2013.01)

(58) Field of Classification Search
CPC H04R 1/1016; H04R 2460/11; H04R 25/652; H04R 25/656; H04R 2460/09
See application file for complete search history.

(56) References Cited

U.S. PATENT DOCUMENTS 4,375,016 A * 2/1983 Harada ................ H04R 25/656 381/328
11,405,717 B2 8/2022 Smith et al.
2012/0057739 A1* 3/2012 Smith .................... H04R 1/105 381/379
2014/0166389 A1* 6/2014 Young-Mun ......... H04R 1/1016 181/135
2015/0030196 A1* 1/2015 Basseas .............. H04L 61/2514 381/380
2018/0146279 A1 5/2018 Wang et al.
2018/0160210 A1* 6/2018 Begusch .............. H04R 1/1091
2018/0221209 A1 8/2018 Ogut et al.
2021/0152924 A1* 5/2021 Keady .................. H04R 1/1016
2021/0243514 A1* 8/2021 Hatfield ............... H04R 1/1016
2022/0031085 A1* 2/2022 Sheikh ................. A47C 27/144

FOREIGN PATENT DOCUMENTS

EP 3926980 A1 * 12/2021 ........... H04R 25/656

* cited by examiner

*Primary Examiner* — Mark Fischer
(74) *Attorney, Agent, or Firm* — Kaplan Breyer Schwarz, LLP

(57) ABSTRACT

An in-ear monitor for placement in an ear canal includes a body housing a transducer for converting creating an acoustic signal. An outlet extends from the housing for the acoustic signal. The monitor includes a tip having a proximal end adjacent the outlet and a distal end disposed in the ear canal. The tip includes an internal sleeve extending from the proximal end to the distal end, the proximal end for receiving the outlet, the distal having an exit aperture to for the signal to exit into the ear canal. An external sleeve extends from the proximal end to the distal end for receipt into the ear canal. The external sleeve is connected to the internal sleeve at the distal end. An annular aperture is disposed between the internal and external sleeves. Vents are disposed at the distal end. A replaceable cellular foam annular member is disposed in the aperture.

10 Claims, 8 Drawing Sheets

IN-EAR MONITOR OPTIMIZED FOR EAR CANAL VOLUME

BACKGROUND OF THE INVENTION

The present invention relates to in-ear monitors. More particularly, the present invention is directed to in-ear monitors for placement in the ear canal of a user to provide for enhanced sound quality.

There are three main types of headphones currently available on the market for audio reproduction; over-the-ear headphones, on-ear headphones, and in-ear monitors. The differences between them are in the way the loudspeaker within the headphones is coupled to the ear. Generally, over-the-ear headphones are the best sounding because it allows sound to interact with the pinna (i.e., the external ear) in a fairly similar way with a stand-alone conventional loudspeaker. On-ear headphones have more challenges to overcome for a better sound, because part of the ear pinna is covered by a coupler, limiting the listener's ability to fully utilize his or her perfectly tuned hearing instrument. The third type of headphones, in-ear monitors, typically offer the poorest sound quality because they eliminate use of the ear pinna, while being coupled directly to an ear canal. The present invention is directed to features that improve the quality of in-ear monitors to achieve the best sound quality possible.

Any properly tuned enclosure with loudspeaker has a perfectly calculated cabinet volume, making sure air pressure in the back of a driver is aligned with the front. So is the case with most over the ear headphones, where manufacturers know fairly average volume of air being trapped by the headphone enclosure in front and in the back of the driver, necessary for its pistonic motion. This is more challenging for an on-ear type of headphones, due to less air being trapped and therefore utilized in front of the driver. In-ear monitor manufacturers must deal with the most challenges, because human ear canals differ quite radically for all and even left and right ear canals of any human are never the same length, width, and height. Air trapped within an in-ear monitor/ear canal/eardrum system is generally never the same, making it extremely difficult to keep the speaker motion pistonic for any given listener.

Conventional in-ear monitors include a transducer that converts an electrical signal into an acoustic signal. The acoustic signal is transmitted through a closed body enclosure that is made up of an acoustic chamber, transducer, front port, nozzle, and ear coupler. There are three main types of ear couplers for coupling the enclosure to ear canals currently being made for an in-ear monitor. The first is an open coupler, where the loudspeaker is hanging on some part of an ear pinna allowing for air to move almost freely in front of it (standard Airpods® currently sold by Apple, Inc. are the most known representation of such concept). Sound quality of this type of in-ear monitor is generally the worst of the three types of couplers, because of the difficulty in creating sufficient air pressure using a small speaker to obtain good quality bass.

The second type of coupler for an in-ear monitor is a silicone ear tip (Airpod Pro® by Apple, Inc. are currently a good example). In such a system, the air is completely trapped within the in-ear monitor/ear canal/eardrum system creating pressure to the front of a speaker cone and equalizing its pistonic motion fairly well, but is limited by the differences in volume of air trapped within a user's ear canals.

The third type of coupler is a foam coupler. This type is the newest type, representing something in between the first two, offering the benefits and drawbacks of both. Such foam couplers essentially have air vents intended to serve as a mechanism for facilitating the release of static air pressure within the ear canal. Foam couplers may either be either open or closed cell foams of different densities and other properties. Depending on the type of material used they may, or may not release static air pressure within the ear canal. The main issue with foam couplers is they tend to change the original sound signature of earbuds to sounding muffled. Foam tips have two parts: the outer foam; and a stiffer inner tube of plastic that slides over the nozzle of the earphone. The rounded end of the foam extends further than the inner tube. When squishing the foam between fingers prior to insertion, the foam remains longer than the tube. This extra foam at the tip can push against the side of the ear canal at the bend and may partially or completely block the end of the tube from which sound emits. This will muffle the sound.

When an in-ear monitor is worn in the ear, the ear canal is blocked by the in-ear monitor and turned into a closed space in which acoustic waves generated by a speaker (i.e., a vibrating membrane) travel back and forth between the in-ear monitor and the eardrum, causing diminished sound quality. However, users may have substantially different ear canal volumes and shapes causing great difficulty in obtaining optimum sound quality. The acoustic waves propagating from the speaker in the in-ear monitor, through the ear canal to the ear drum and back in the ear canal also generate an undesirable force on the vibrating membrane of the speaker such that acoustic waves subsequently generated by the vibrating membrane are compromised, resulting in distortion of sound. Because such in-ear monitors essentially seal the ear canal, they create a small air volume with the eardrum (tympanic membrane) at one end and the in-ear monitor tip at the other. The resulting volume can differ substantially from one person to another and even one ear to another in a single person, thereby affecting the quality of sound of the in-ear monitors.

SUMMARY OF THE INVENTION

An in-ear monitor for placement in an ear canal of a user is provided where the in-ear monitor is configurable to optimize sound quality. In a first exemplary embodiment of the present invention, the in-ear monitor includes a body having a front end and a rear end and houses a transducer, and other elements common in in-ear monitors. The transducer is for converting an electrical signal into an acoustic signal. An outlet port extends from the front end of the body to direct the acoustic signal out of the body through the outlet port. An in-ear monitor tip is provided that has a proximal end adjacent the outlet port and a distal end disposed in the ear canal of the user. The in-ear monitor tip includes an internal sleeve extending from the proximal end to the distal end. The proximal end of the internal sleeve is for receiving the outlet port of the body, and the distal end of the internal sleeve has an exit aperture to provide for the acoustic signal to exit the in-ear monitor into the ear canal of the user. An external sleeve extends from the proximal end to the distal end for receipt into the ear canal of the user. The external sleeve is connected to the internal sleeve at the distal end. An annular aperture is disposed between the internal sleeve and the external sleeve. An array of vent apertures is disposed at the distal end of the in-ear monitor tip. A cellular foam annular member is disposed in the annular aperture, where the foam annular member is removable and replaceable with a foam annular member having a different density.

The in-ear monitor may include several replacement foam annular members, each replacement foam annular member having a different density. The internal sleeve may be releasably fastened to the external sleeve. The exit aperture of the internal sleeve of the in-ear monitor tip may have a vortex shape. The vortex shape may be, for example, a twist from 40 degrees to 4 degrees. The external sleeve may include an exterior wall, wherein the exterior wall has ribs disposed where the exterior wall abuts the ear canal of the user. The in-ear monitor tip may be fabricated from, for example, silicon, resin, or polyethylene. The cellular foam member is constructed from a foam material, for example, copper infused memory foam.

In a second exemplary embodiment of the present invention, an in-ear monitor for placement in an ear canal of a user is provided where the in-ear monitor configurable to optimize sound quality. The in-ear monitor includes a body having a front end and a rear end, the body housing a transducer, the transducer for converting an electrical signal into an acoustic signal. An outlet port is provided extending from the front end of the body to direct the acoustic signal out of the body through the outlet port. The in-ear monitor further includes an in-ear monitor tip having a proximal end adjacent the outlet port and a distal end disposed in the ear canal of the user. The in-ear monitor tip first includes an internal sleeve extending from the proximal end to the distal end, the proximal end of the internal sleeve for receiving the outlet port of the body, and the distal end of the internal sleeve having an exit aperture to provide for the acoustic signal to exit the in-ear monitor into the ear canal of the user. The in-ear monitor tip further includes an external sleeve extending from the proximal end to the distal end for receipt into the ear canal of the user, the external sleeve connected to the internal sleeve at the distal end. Finally, the in-ear monitor tip includes an annular aperture disposed between the internal sleeve and the external sleeve. An array of vent apertures is disposed at the distal end of the in-ear monitor tip.

The exit aperture of the internal sleeve of the in-ear monitor tip may have a vortex shape. The vortex shape may be a twist from 40 degrees to 4 degrees. The external sleeve may include an exterior wall, wherein the exterior wall has a plurality of ribs disposed where the exterior wall abuts the ear canal of the user.

DETAILED DESCRIPTION

Figure 1:
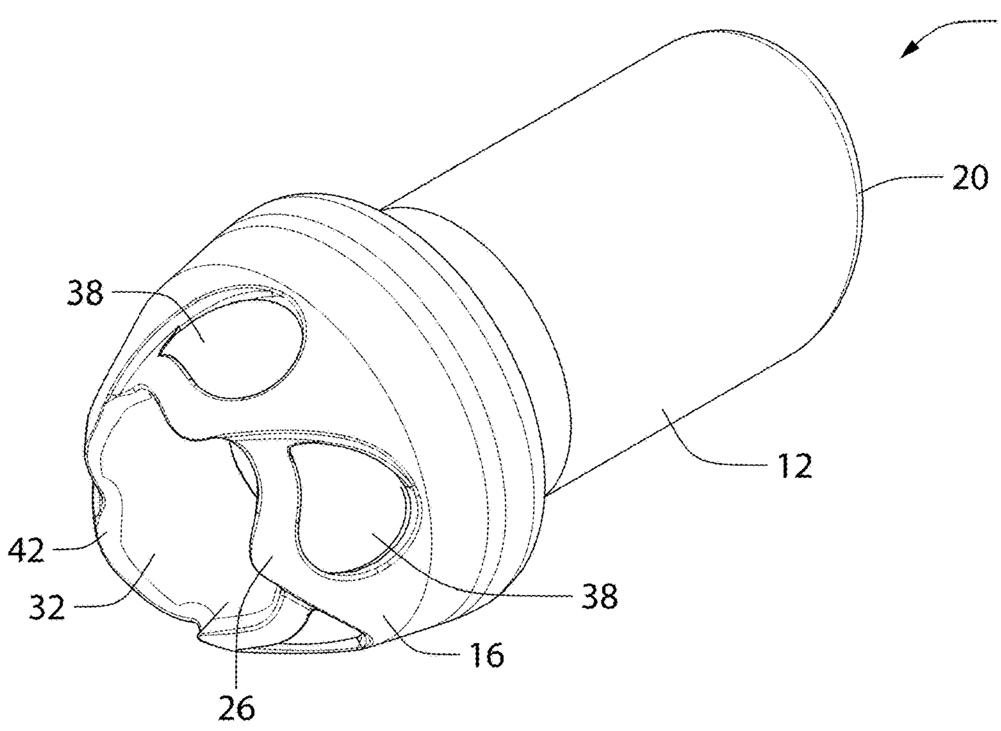
FIG. 1 is a front isometric view of an in-ear monitor in accordance with an exemplary embodiment of the present invention.
Figure 2:
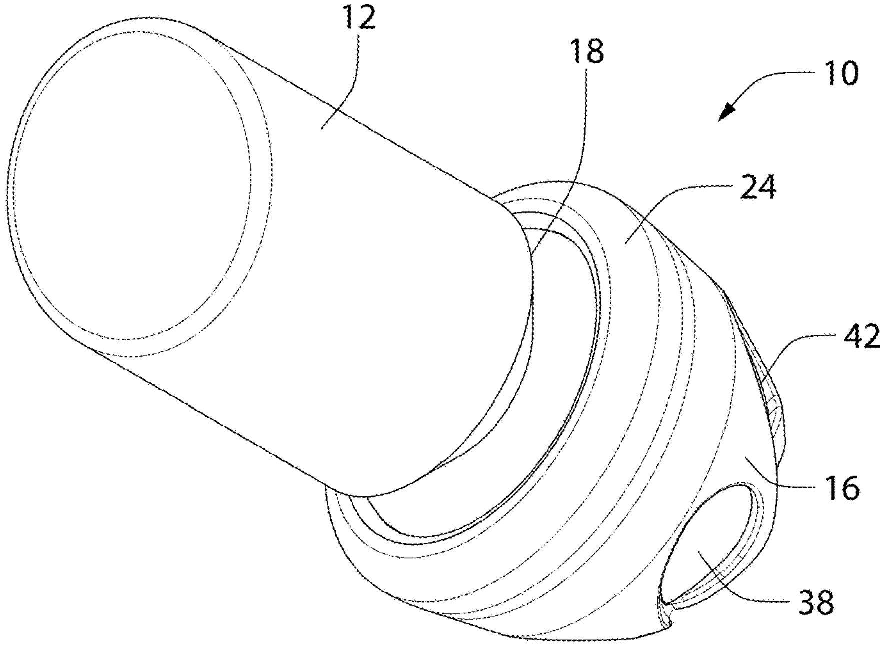
FIG. 2 is a rear isometric view of the in-ear monitor of FIG. 1.
Figure 3:
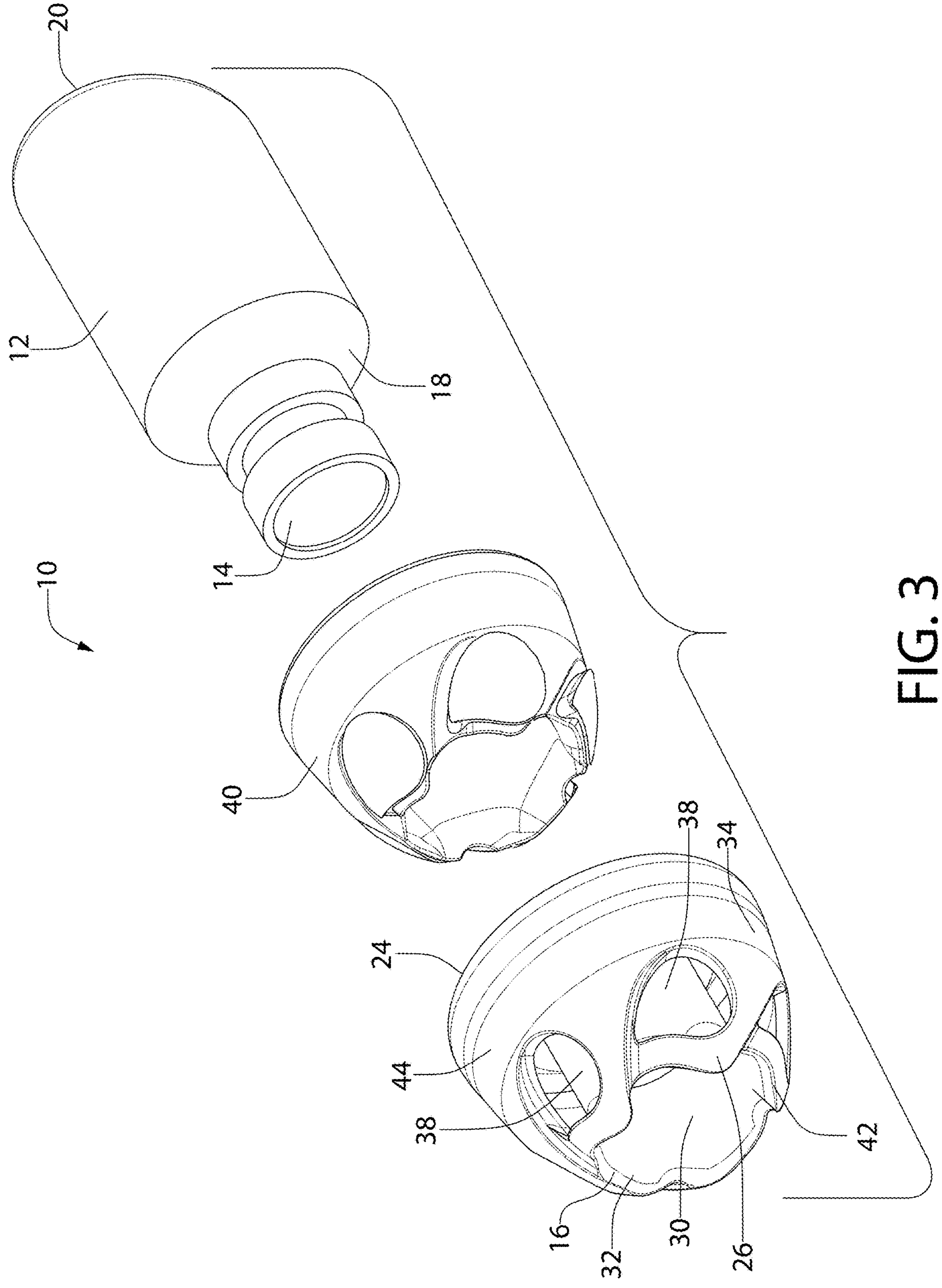
FIG. 3 is a front, exploded isometric view of the in-ear monitor of FIG. 1.
Figure 4:
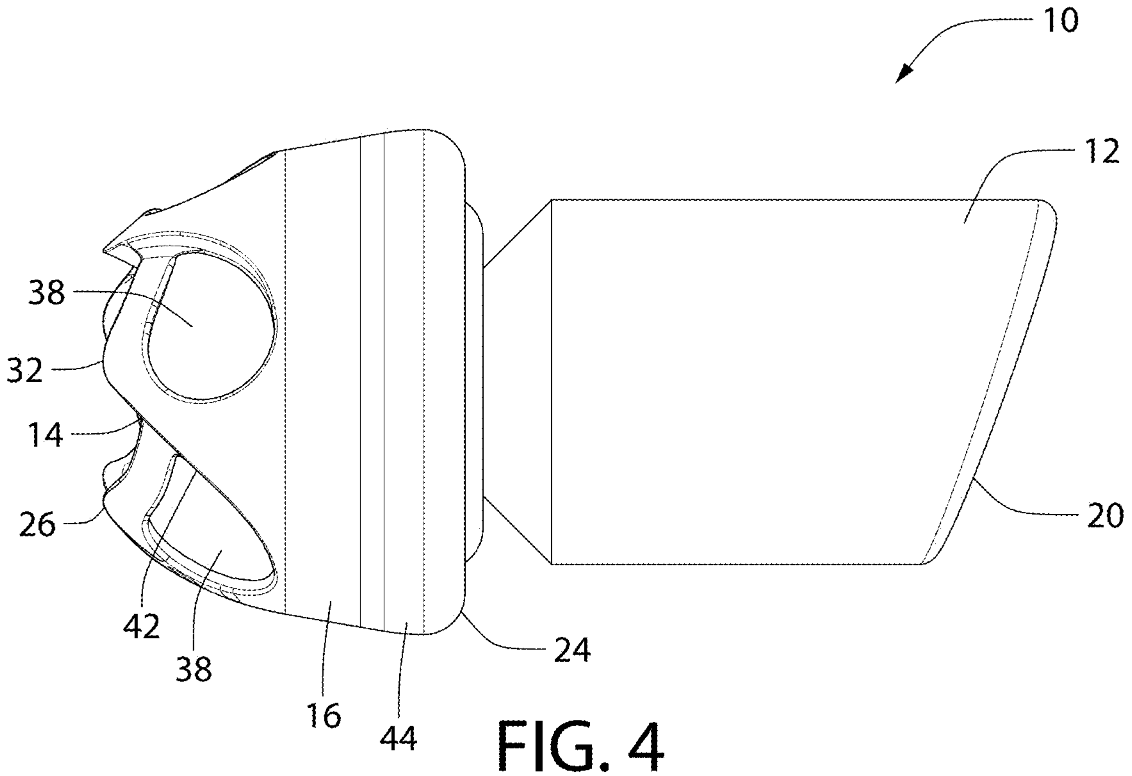
FIG. 4 is a left side elevation view of the in-ear monitor of FIG. 1.
Figure 5:
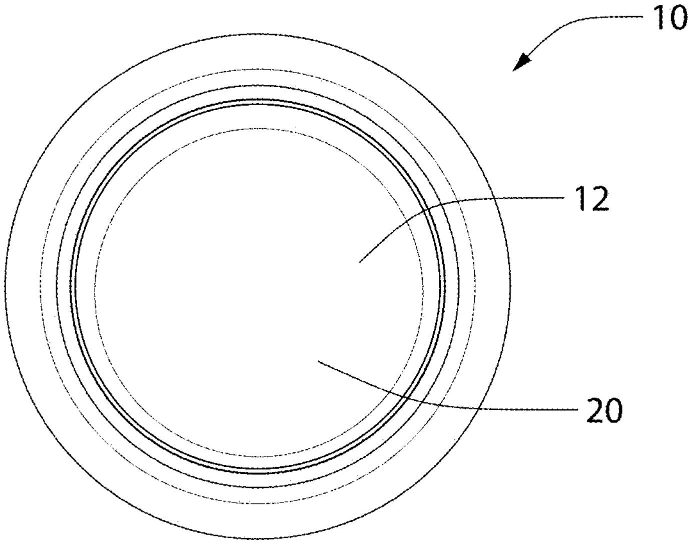
FIG. 5 is a rear elevation view of the in-ear monitor of FIG. 1.
Figure 6:
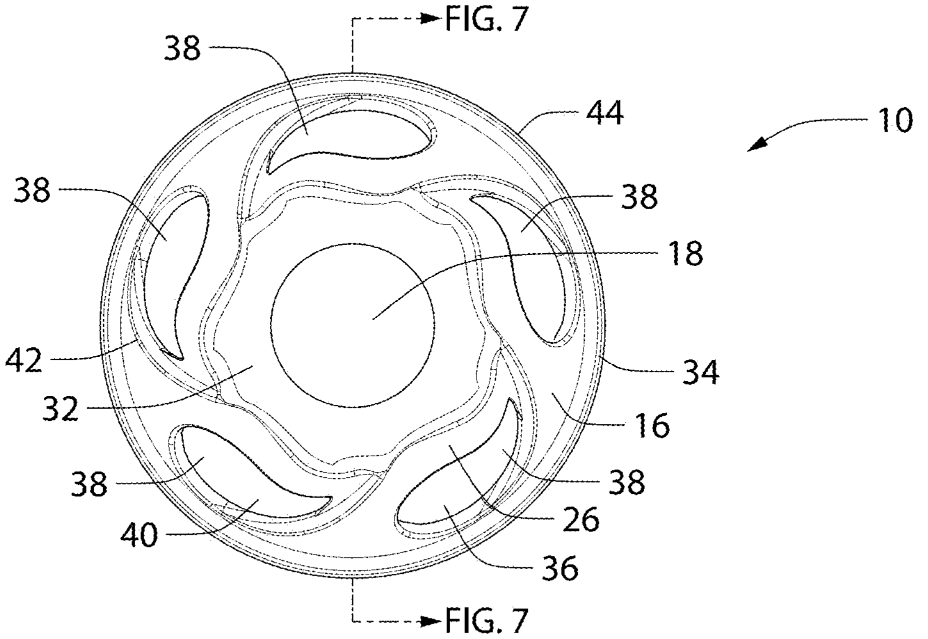
FIG. 6 is a front elevation view of the in-ear monitor of FIG. 1.

The present invention is directed to in-ear monitors for placement in the ear canal of a user to provide enhanced sound quality. In-ear monitors typically lack an ability to tune sound to a listener's hearing. Generally, a loudspeaker for any type of headphone produces sound waves via pistonic motion of a speaker cone or a membrane. It is important that air pressure in the front and back of such piston be properly equalized (if, suddenly, air pressure on either side decreases, pistonic motion of any speaker driver goes out of control creating distortions in sound reproduction). An aspect of the in-ear monitor of the present invention is the utilization of air channels (i.e., annular apertures) in the ear-monitor tip body so that acoustic waves reflected by the eardrum while the in-ear monitor is in use propagate out of the ear canal through the air channels to contribute to an enhancement in sound quality. The in-ear monitors of the present invention provide for a listener to manage the air trapped within the in-ear monitor/eardrum/ear canal system for optimized coupling, sound control and alignment.

Referring now to the drawing figures wherein like reference numbers refer to like elements throughout the several views, there is shown in FIGS. 1-7 an in-ear monitor 10 for placement in an ear canal of a user in accordance with an exemplary embodiment of the present invention. The in-ear monitor 10 is configurable to optimize sound quality. The in-ear monitor 10 includes a body 12 having an outlet port 14 and an in-ear monitor tip 16. The body 12 has a front end 18 and a rear end 20 and houses a transducer 22 for converting an electrical signal into an acoustic signal as well as other elements common in in-ear monitors as are well known. The outlet port 14 extends from the front end 18 of the body 12 to direct an acoustic signal out of the body 12 through the outlet port 14.

The in-ear monitor tip 16 has a proximal end 24 adjacent the outlet port 14 and a distal end 26 disposed in the ear canal 28 of the user. The in-ear monitor tip 16 includes an internal sleeve 30 extending from the proximal end 24 to the distal end 26. The proximal end 24 of the internal sleeve 30 is for receiving the outlet port 14 of the body 12. The distal end 26 of the internal sleeve 30 has an exit aperture 32 to provide for the acoustic signal to exit the in-ear monitor 10 into the ear canal 28 of the user. The in-ear monitor tip 16 further has an external sleeve 34 extending from the proximal end 24 to the distal end 26 for receipt into the ear canal 28 of the user. The external sleeve 34 is connected to the internal sleeve 30 at the distal end 26 of the in-ear monitor tip 16. An annular aperture 36 is disposed between the internal sleeve 30 and the external sleeve 34. The internal sleeve 30 is connected to the external sleeve 34 at the distal end 36 of the in-ear monitor tip 16. An array of vent apertures 38 is disposed at the distal end 26 of the in-ear monitor tip 16.

Figure 7:
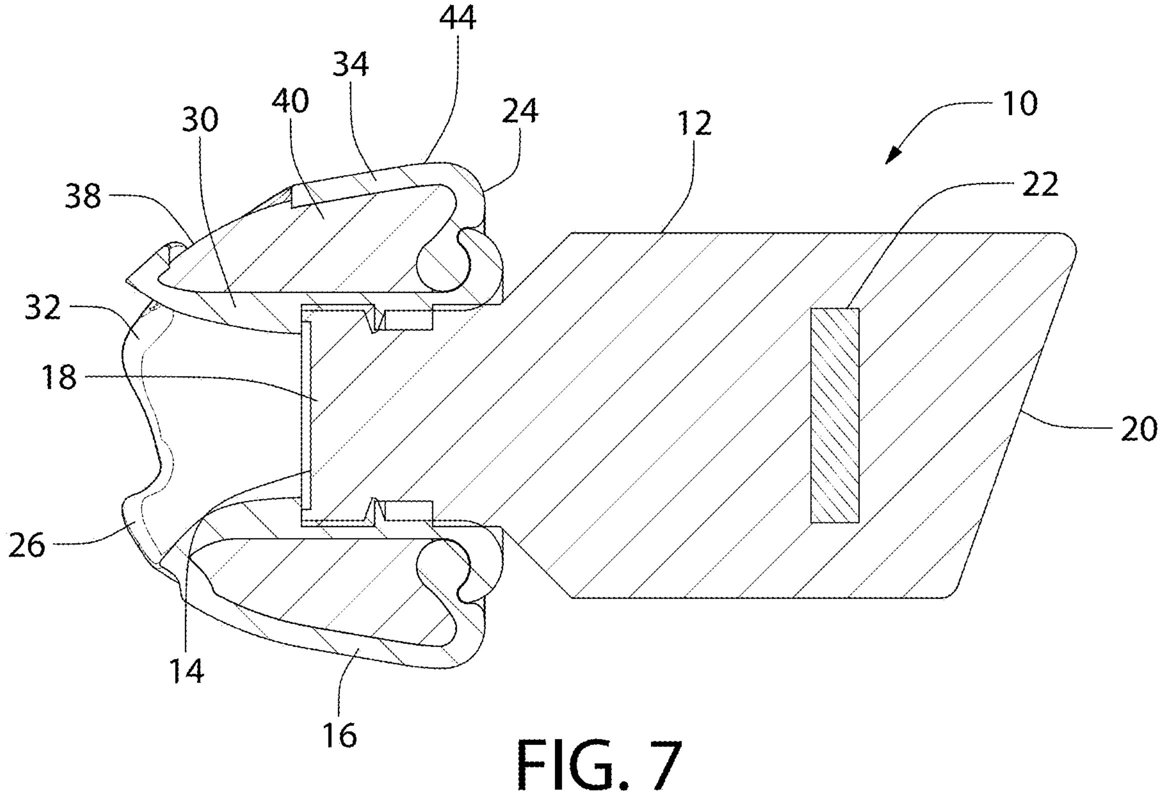
FIG. 7 is a cross-sectional view of the in-ear monitor of FIG. 1, taken along lines A-A of FIG. 6.
Figure 7A:
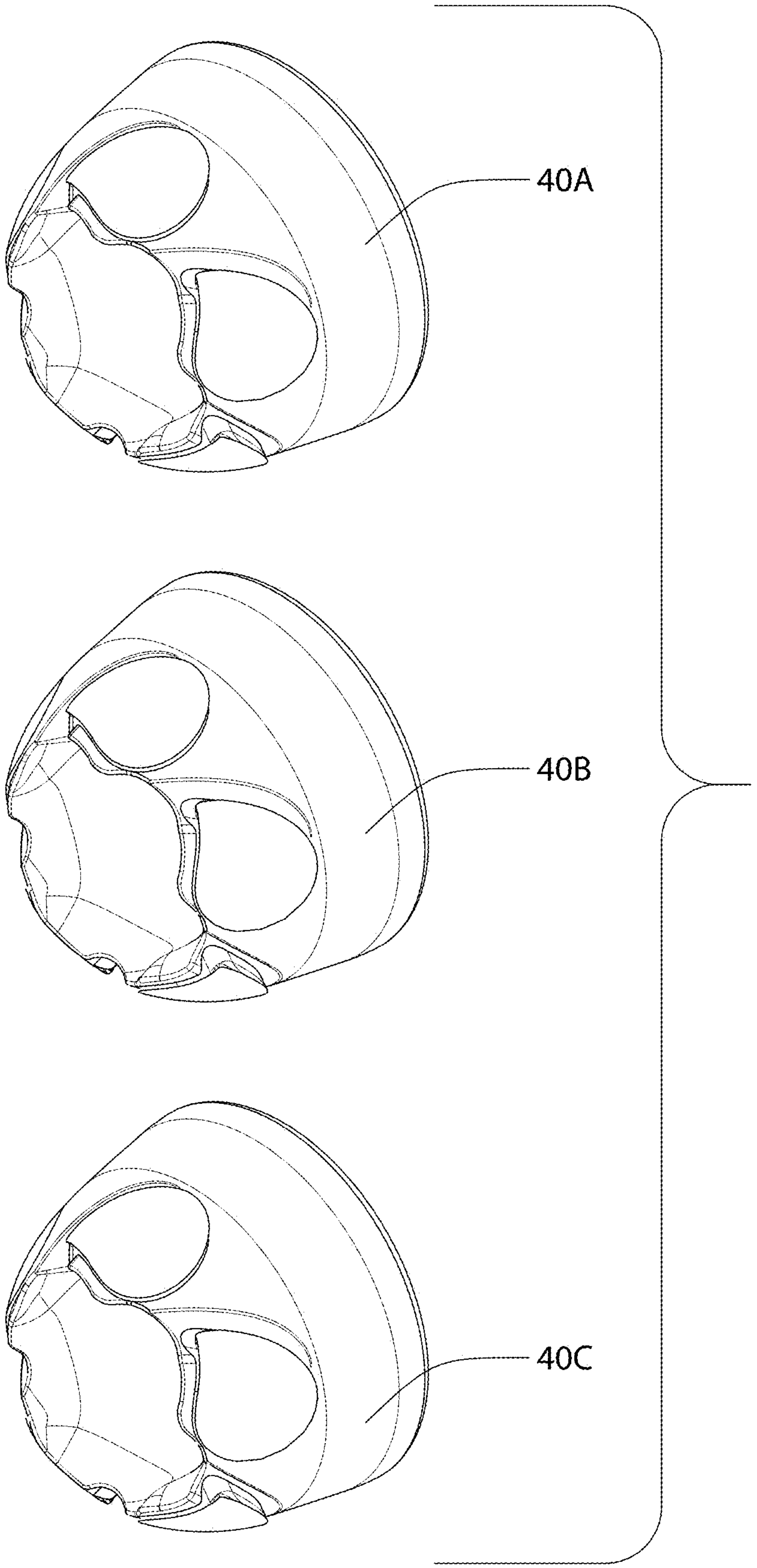
FIG. 7A depicts front isometric views of a cellular foam members shown in the cross-sectional view of FIG. 7 of the in-ear monitor of FIG. 1.
Figure 8:
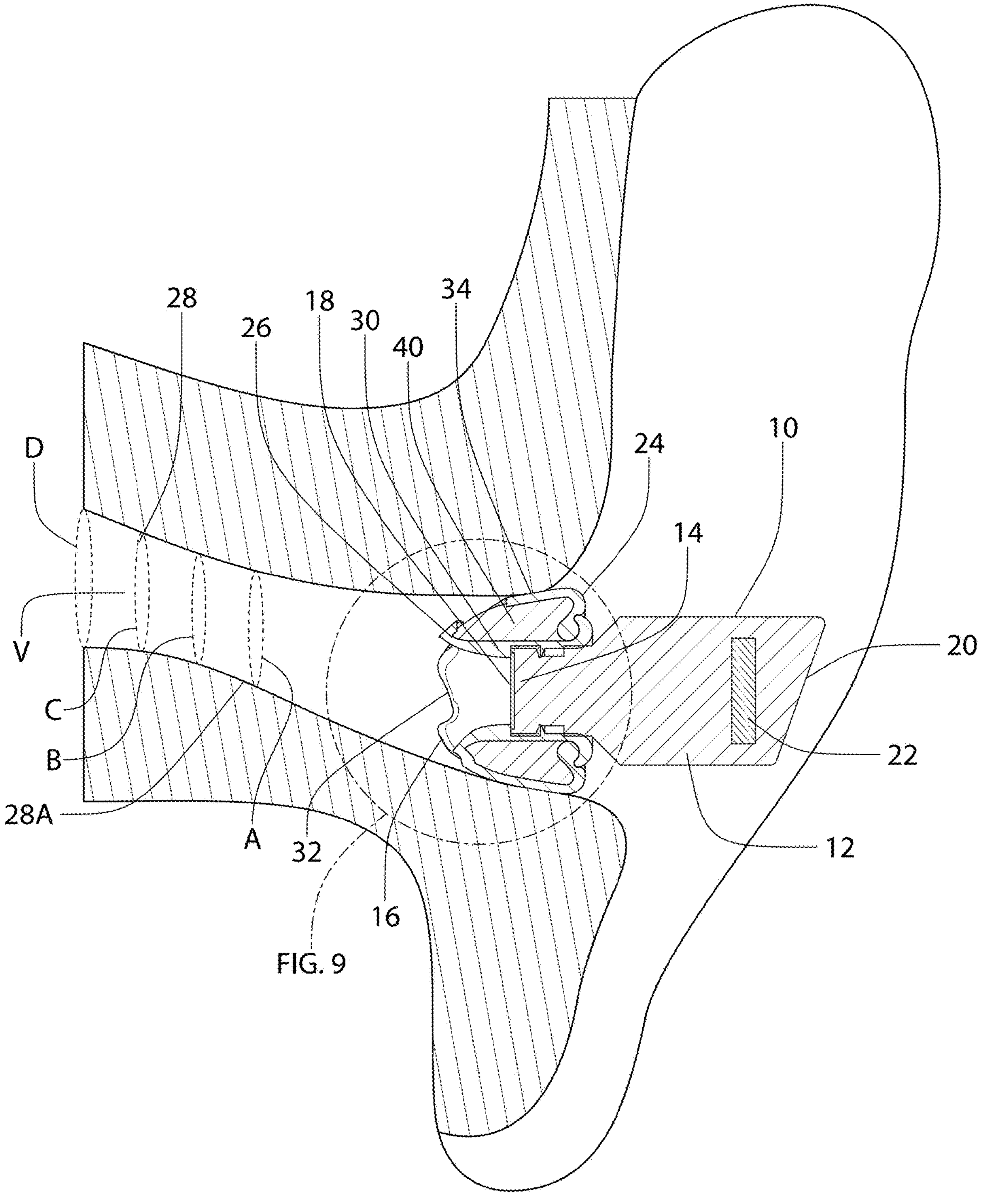
FIG. 8 is a right side elevation view of the in-ear monitor of FIG. 1, showing its placement in the ear canal of a user.
Figure 9:
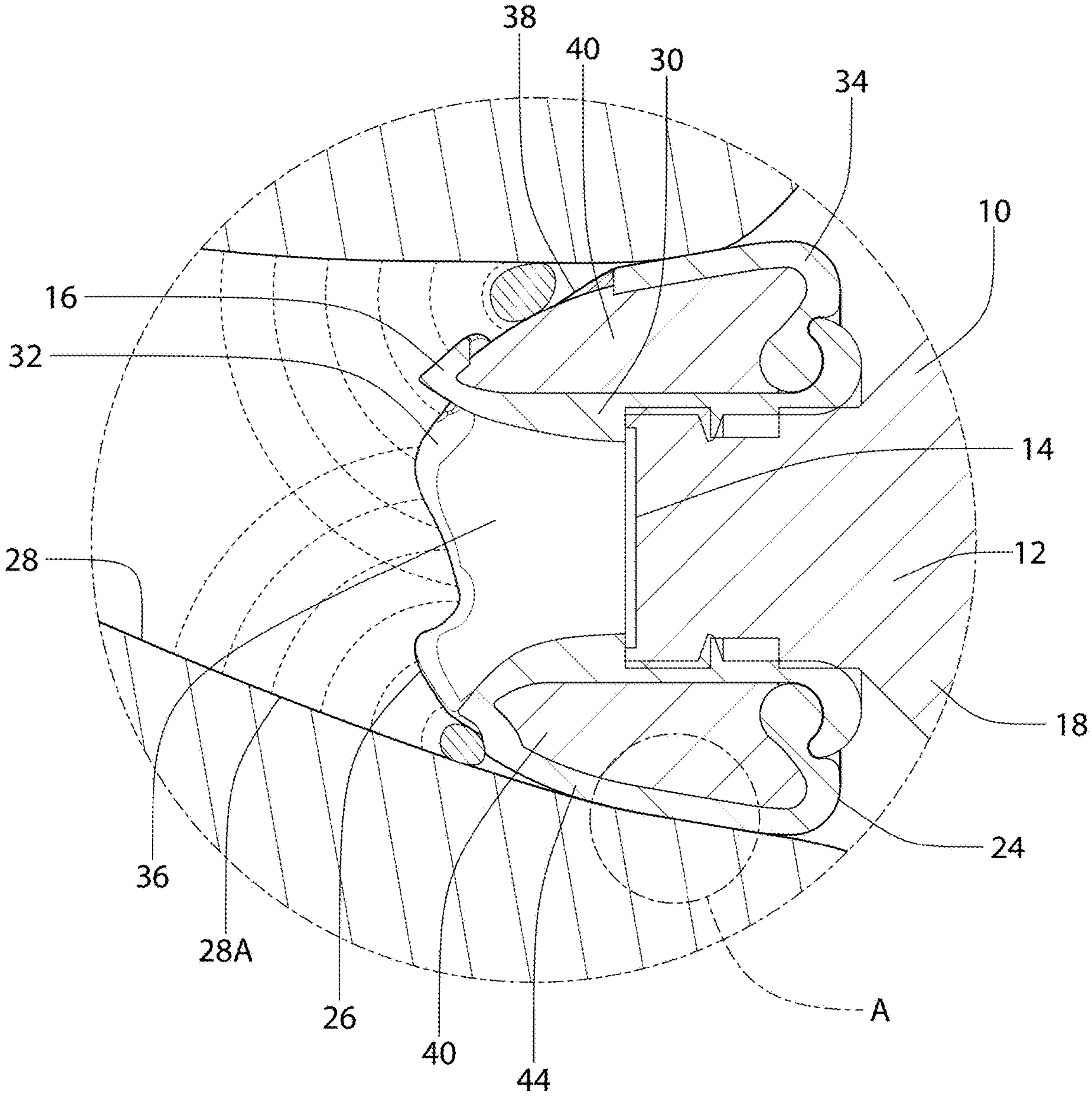
FIG. 9 is an enlarged side view of the in-ear monitor of FIG. 1, showing its placement in an ear canal with an enlarged view of ear tip ridges disposed against the ear canal.

As best seen in FIGS. 7, 8 and 9, a cellular foam annular member 40 is disposed in the annular aperture 36. The annular member 40 is removable and replaceable. Replacement foam annular members 40*a*, 40*b*, 40*c* etc. may be provided where each replacement foam annular member 40A, 40B, 40C, etc. may have a different density. See FIG. 7A. Each replacement foam annular member is replaceable with any other of the replacement foam annular members 40*a*, 40*b*, 40*c*. The internal sleeve 30 may be releasably fastened to the external sleeve 34 to secure the cellular foam member 40 or replacement cellular foam members 40A, 40B, 40C in place in the in-ear monitor tip 16. The exit aperture 32 of the internal sleeve 30 of the in-ear monitor tip 16 may have a vortex shape 42. The vortex shape 42 may be a twist from, for example, 40 degrees to 4 degrees. The external sleeve 34 has an exterior wall 44. The exterior wall 44 may have numerous ribs 46 disposed where the exterior wall 44 abuts the ear canal 28 of the user. The in-ear monitor tip 16 is preferably fabricated from silicon.

The cellular foam member is constructed from an open cell foam material or a closed cell material, for example, a commonly available copper infused memory foam. Copper is a known antimicrobial additive which helps prevent the growth of bacteria. Initially typically white in color, this foam eventually changes to an orangish-reddish color because of the copper that is infused inside. During normal use copper will transfer its color due to oxidation. There are certain conditions that speed up the oxidation process:

Light: this could be due to exposure to UV light or sunlight.

Moisture: humidity and sweat will contribute to an eventual discoloration of the foam.

Temperatures—this includes temperature changes when the ear tip is being inserted into the ear canal.

This change in color assists in a user ascertaining whether foam member replacement is desirable.

Based on the in-ear monitor 10 as described above, there are several features that, alone and/or in combination provide for substantially higher sound quality that of prior art in-ear monitors.

The in-ear monitor 10 of the present invention optimizes sound quality by managing air trapped within the between the in-ear monitor tip 16 and the eardrum within the ear canal. For present purposes, this is designated the ear canal volume V. The ear canal volume can vary substantially from user to user and even from left ear to right ear in a user. As can be seen the simplified example shown in FIG. 8, an ear canal 28 length between the in-ear monitor tip 16 and the eardrum. In this example, the eardrum may be located at position A, B, C or D (or any location in between) relative to the in-ear monitor tip 16. The volume V may vary, for the purposes of this example from 0.5 $cm^3$ (at position A) to 1.75 $cm^3$ (at position C). By varying the density and/or cellular structure of the cellular foam member 40, the "effective volume" of the ear canal volume V can be adjusted to mimic an optimized ear canal volume. The foam member 40 may be composed of either open or closed cells, with memory and/or cooling properties. This design acts as a bass trap and an optimal regulator of air pressure between the ear canal and the earbud loudspeaker system. Additionally, it assists in maintaining the temperature and humidity levels within the ear canal coupler, contributing to the creation of a healthy environment. As used herein, "foam" is a material comprising trapped pockets of gas (cells or pores; the gas may simply be air). An "open cell foam" comprises cells that are not completely encapsulated. By contrast, closed cell foam is made up of cells that are encapsulated (enclosed). The open cell foam has a network of cells or pores which extends from the surface through at least a portion of the interior of the foam, and preferably, all of the foam. The cells or pores on the interior are interconnected with cells or pores on the surface of the foam. The cellular foam member 40 may range from a thin layer of foam on sides, to the annular aperture 36 being filled completely, a foam of a certain density compressed within the annular aperture to achieve higher density. In fact, in certain instances, the foam member 40 may be eliminated entirely. Generally, the smaller volume V, the more dense the foam member 40 and the larger the volume V, the less dense the foam member 40 to the point that no foam member 40 is required for a very large volume V.

The next feature of the present invention is the strategically sized and positioned array of vent apertures 38 disposed at the distal end 26 of the in-ear monitor tip 16. These vent apertures 38 are designed to ensure optimal access to the annular aperture 36 that balances ear canal volume disparities by use of replaceable foam members 40 offering a choice of densities. The specific placement of the vent apertures 38 is intended to minimize interference with direct sound waves while maximizing the capture of reflected sound.

Figure 9A:
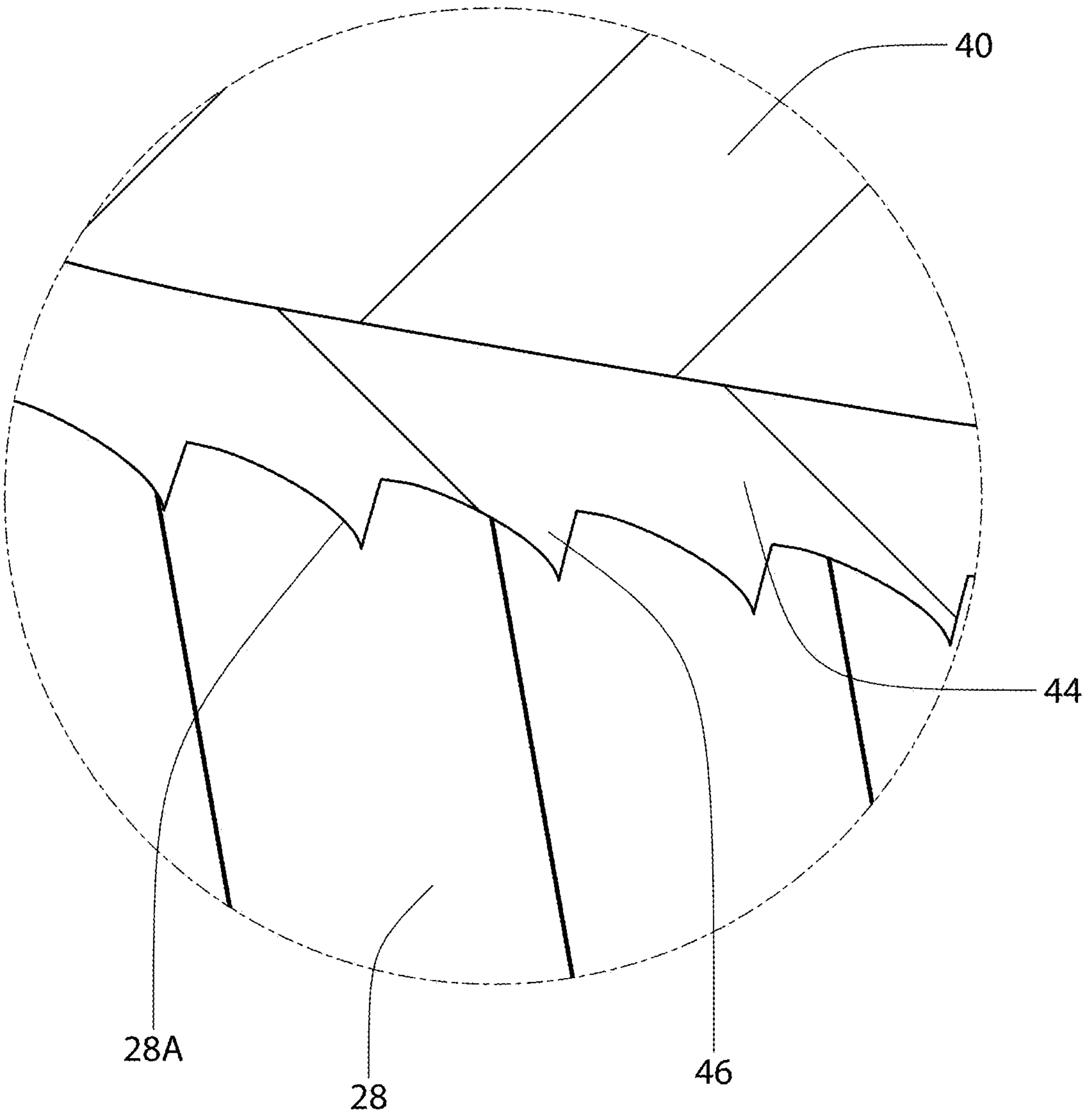
FIG. 9A is a detail view of the enlarged side view of FIG. 9, taken at callout A of FIG. 9.

The next feature is a sealing mechanism that ensures a superior coupling of the in-ear monitor tip and the ear canal. This seal is essential for effective passive noise isolation from external sounds and for ensuring the proper functionality of active noise cancellation systems. The sealing utilizes ribs 46 on the external sleeve 34 disposed where the exterior wall 44 abuts the ear canal 28 of the user. These ribs disrupt backfiring soundwaves from the ear canal walls and eardrum, akin to coastal wave breakers that settle waters to protect shorelines. Another function of these ribs is to maintain a free passage for the sound waves to access the foam member 40 by preventing a blockage from interaction with ear canal walls 28*a*. See FIG. 9A which show an enlarged view of an interface between the in-ear monitor tip 16 and the ear canal wall 28*a*.

The next feature is the vortex-inducing design provided by the vortex shape 42 of the exit aperture 32 of the internal sleeve 30 of the in-ear monitor tip 16. Preferably, this vortex shape is best seen, in combination, in FIGS. 1, 3, 4, 6 and 7A. The vortex shape initiates on the inner mouth of the ear tip and continues to the outer "umbrella" wall which comes in contact with the ear canal walls 28*a*. The inner mouth part first interacts with the sound waves generated by a loudspeaker in the body 12, by gently shifting them to avoid creation of standing waves and resonances, preventing formation of extraneous noise common for tubular couplers. The second main function of this vortex structure is to maximally dissipate and direct towards the foam openings, all the backfiring soundwaves reflected from the ear canal and prevent a head on collision with the wall of sound generated by the loudspeaker. This vortex shape 42 facilitates smooth sound transmission, mitigating the formation and disturbance of standing waves and resonances when sound waves reflect and collide, rebounding towards the speaker from the ear canal. See FIG. 9 which show sound waves entering the in-ear monitor tip 16. The vortex shape allows air to enter the in-ear monitor tip 16 easier in that the path of the sound waves vary. The vortex inducing design also assists in extending the overall size of the soundstage in a manner similar to how human ear pinna folds evolved not only to specifically amplify frequencies of the human voice, but are also to pinpointing the height of a sound sources. This way, the soundstage created with the help of the groves designed within the mouth of the tip 16 becomes much larger, virtually bringing the absent human ear pinna back into the picture.

Essentially, the vortex shape 42 of the present invention changes the angles inside the inner portion of the earphone tip 16 by making them different from each other in various cross-sections. This means that if you look at different slices of the port, the angles at which the inner surfaces meet would vary, helping to control the airflow and reduce noise. The helical inner surface follows a helical, or spiral-like, path. This design ensures that as the air motion induced by the sound waves moves through the opening, it follows a twisting route, which smooths out the airflow and reduces noise. The inner surface of the earphone tip 16 has alternating high and low areas. These variations help manage the sound pressure and flow, further reducing noise. Above all, the high level areas also assist in extending the overall size of the soundstage in a manner similar to how human ear pinna folds evolved not only to specifically amplify frequencies of the human voice, but are also to pinpointing the height of a sound sources. This way, the soundstage created with the help of the groves designed within the mouth of the tip 16 becomes much larger, virtually bringing the absent human ear pinna back into the picture. The tubular shape of the opening is designed so that the inner radial lines (lines drawn from the center to the edge) at different points along the length of the port are at different angles to a reference plane. This helps in managing the flow of soundwaves more effectively.

By implementing these design changes, the invention aims to provide a clearer and more enjoyable sound by minimizing the extra noise that can sometimes occur with powerful speakers.

In summary, the invention provides a detailed approach to redesigning the mouth opening of the earphone top 16 to enhance the audio experience by reducing noise and improving bass quality. The varying angles and helical paths inside the opening are key to its performance, making it a significant improvement over traditional designs.

While each of these features is engineered to enhance a specific aspect of the auditory and loudspeaker system interaction, they perform optimally together, yielding amplified benefits through a synergistic effect.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An in-ear monitor for placement in an ear canal of a user, the in-ear monitor configurable to optimize sound quality, comprising:

(a) a body having a front end and a rear end, the body housing a transducer, said transducer for converting an electrical signal into an acoustic signal;

(b) an outlet port extending from the front end of the body to direct the acoustic signal out of the body through the outlet port;

(c) in-ear monitor tip having a proximal end adjacent the outlet port and a distal end disposed in the ear canal of the user, the in-ear monitor tip comprising:

(i) an internal sleeve extending from the proximal end to the distal end, the proximal end of the internal sleeve for receiving the outlet port of the body, and the distal end of the internal sleeve having an exit aperture to provide for the acoustic signal to exit the in-ear monitor into the ear canal of the user;

(ii) an external sleeve extending from the proximal end to the distal end for receipt into the ear canal of the user, the external sleeve connected to the internal sleeve at the distal end; and (iii) an annular aperture disposed between the internal sleeve and the external sleeve;

(iv) an array of vent apertures disposed at the distal end of the in-ear monitor tip; and (d) a cellular foam annular member disposed in the annular aperture, said foam annular member being removable and replaceable with a cellular foam annular member having a different density; and (e) a plurality of replacement foam annular members, each replacement foam annular member having a different density, wherein the foam annular member is replaceable with any one of the plurality of replacement foam annular members.

2. The in-ear monitor of claim 1, wherein the internal sleeve is releasably fastened to the external sleeve.

3. The in-ear monitor of claim 1, wherein the external sleeve includes an exterior wall, wherein the exterior wall has a plurality of ribs disposed where the exterior wall abuts the ear canal of the user.

4. The in-ear monitor of claim 1, wherein the in-ear monitor tip is fabricated from a material selected from the group consisting of silicon, resin and polyethylene.

5. The in-ear monitor of claim 1, wherein the cellular foam member is constructed from copper infused memory foam.

6. An in-ear monitor for placement in an ear canal of a user, the in-ear monitor configurable to optimize sound quality, comprising:

(a) a body having a front end and a rear end, the body housing a transducer, said transducer for converting an electrical signal into an acoustic signal;

(b) an outlet port extending from the front end of the body to direct the acoustic signal out of the body through the outlet port;

(c) in-ear monitor tip having a proximal end adjacent the outlet port and a distal end disposed in the ear canal of the user, the in-ear monitor tip comprising:

(i) an internal sleeve extending from the proximal end to the distal end, the proximal end of the internal sleeve for receiving the outlet port of the body, and the distal end of the internal sleeve having an exit aperture to provide for the acoustic signal to exit the in-ear monitor into the ear canal of the user wherein the exit aperture of the internal sleeve of the in-ear monitor tip has a vortex shape, wherein the vortex shape is a twist from 40 degrees to 4 degrees;

(ii) an external sleeve extending from the proximal end to the distal end for receipt into the ear canal of the user, the external sleeve connected to the internal sleeve at the distal end;

(iii) an annular aperture disposed between the internal sleeve and the external sleeve; and (iv) an array of vent apertures disposed at the distal end of the in-ear monitor tip; and (d) a cellular foam annular member disposed in the annular aperture, said foam annular member being removable and replaceable with a cellular foam annular member having a different density.

7. An in-ear monitor for placement in an ear canal of a user, the in-ear monitor configurable to optimize sound quality, comprising:

(a) a body having a front end and a rear end, the body housing a transducer, said transducer for converting an electrical signal into an acoustic signal;

(b) an outlet port extending from the front end of the body to direct the acoustic signal out of the body through the outlet port;

(c) in-ear monitor tip having a proximal end adjacent the outlet port and a distal end disposed in the ear canal of the user, the in-ear monitor tip comprising:

(i) an internal sleeve extending from the proximal end to the distal end, the proximal end of the internal sleeve for receiving the outlet port of the body, and the distal end of the internal sleeve having an exit aperture to provide for the acoustic signal to exit the in-ear monitor into the ear canal of the user, wherein the exit aperture of the internal sleeve of the in-ear monitor tip has a vortex shape, wherein the vortex shape is a twist from 40 degrees to 4 degrees;

(ii) an external sleeve extending from the proximal end to the distal end for receipt into the ear canal of the user, the external sleeve connected to the internal sleeve at the distal end; and (iii) an annular aperture disposed between the internal sleeve and the external sleeve; and (iv) an array of vent apertures disposed at the distal end of the in-ear monitor tip.

8. The in-ear monitor of claim 7, wherein the external sleeve includes an exterior wall, wherein the exterior wall has a plurality of ribs disposed where the exterior wall abuts the ear canal of the user.

9. The in-ear monitor of claim 7, wherein the in-ear monitor tip is fabricated from a material selected from the group consisting of silicon, resin and polyethylene.

10. The in-ear monitor of claim 7, wherein the cellular foam member is constructed from a material selected from copper infused memory foam.

* * * * *